United States Patent
Ikeda et al.

(10) Patent No.: US 7,280,844 B2
(45) Date of Patent: Oct. 9, 2007

(54) WRISTWATCH TYPE CELLULAR PHONE

(75) Inventors: Takeshi Ikeda, Tokyo (JP); Akira Okamoto, Ageo (JP)

(73) Assignee: Niigata Seimitsu Co., Ltd. (JP)

( * ) Notice: Subject to any disclaimer, the term of this patent is extended or adjusted under 35 U.S.C. 154(b) by 303 days.

(21) Appl. No.: 10/710,529

(22) Filed: Jul. 19, 2004

(65) Prior Publication Data
US 2005/0020302 A1     Jan. 27, 2005

(30) Foreign Application Priority Data
Jul. 22, 2003    (JP) ............................. 2003-277513

(51) Int. Cl.
*H04M 1/00*    (2006.01)

(52) U.S. Cl. .............. 455/556.1; 455/550.1; 455/575.1; 455/575.6; 455/575.7; 379/433.1; 368/4; 368/10; 368/13

(58) Field of Classification Search ............ 455/550.1, 455/556.1, 573, 575.1–575, 575.3, 575.6, 455/575.7; 379/428.01, 430, 433.01, 433.1, 379/433.13; 368/10, 13, 4; 224/164
See application file for complete search history.

(56) References Cited

U.S. PATENT DOCUMENTS

| | | | |
|---|---|---|---|
| 5,381,387 A | * | 1/1995 | Blonder et al. ............... 368/10 |
| 5,634,206 A | * | 5/1997 | Reed et al. ............... 455/277.2 |
| 6,158,884 A | * | 12/2000 | Lebby et al. ............... 368/282 |
| 6,801,476 B2 | * | 10/2004 | Gilmour ....................... 368/13 |

FOREIGN PATENT DOCUMENTS

| | | |
|---|---|---|
| JP | 5276056 | 10/1993 |
| JP | 6232950 | 8/1994 |
| JP | 9055679 | 2/1997 |
| JP | 11177663 | 7/1999 |
| JP | 2000286939 | 10/2000 |
| JP | 2001028620 | 1/2001 |
| JP | 2001045122 | 2/2001 |
| JP | 2001345907 | 12/2001 |

* cited by examiner

*Primary Examiner*—Edward F. Urban
*Assistant Examiner*—Raymond S. Dean
(74) *Attorney, Agent, or Firm*—Connolly Bove Lodge & Hutz LLP

(57) ABSTRACT

A plurality of plane antennas 6-1 and 6-2 are embedded in the equipment body section 1, and every time occurrence of reception failure is detected by the internal electronics circuit, switching between the antennas used is established. Spatial diversity through selectively switching and using the plurality of plane antennas 6-1 and 6-2 is performed. Through this, even when reception sensitivity of one antenna in use deteriorates, good reception sensitivity can be gained through switching to another antenna. Thus, this can avoid inconvenience where calls are cut off.

5 Claims, 2 Drawing Sheets

(a) SURFACE (b) BACK SIDE

WRISTWATCH TYPE CELLULAR PHONE

BACKGROUND OF THE INVENTION

1. Field of the Invention

The present invention relates to a wristwatch type cellular phone. In particular, it is suitable as a wristwatch type cellular phone that has a equipment body section having clocking functions of a clock and a wrist band so as to enable the equipment body section to be placed on or pulled out of a wrist, and where the equipment body section incorporates an electronic circuit of the phone section that transacts dialing functions.

2. Description of the Related Art

Recently, cellular phones have become smaller and lighter, and a wristwatch type cellular phone has been also developed. The wristwatch type cellular phone has a portion equivalent to a clocking section of a wristwatch, and a portion equivalent to phone section necessary for cellular phone functions (communications section, operation section, transmitter section (microphone), and receiver section (speaker), etc.). Various devices have been made regarding this type of wristwatch type cellular phone in light of operationality for making a phone call, and user-friendliness of transmitting or receiving a phone call, etc. (for example, refer to patent documents 1-8: Patent document 1 (JP patent laid-open No. 5-276056), Patent document 2 (JP patent laid-open No. 6-232950), Patent document 3 (JP patent laid-open No. 9-55679), Patent document 4 (JP patent laid-open No. 11-177663), Patent document 5 (JP patent laid-open No. 2000-286939), Patent document 6 (JP patent laid-open No. 2001-28620), Patent document 7 (JP patent laid-open No. 2001-45122), and Patent document 8 (JP patent laid-open No. 2001-345907).

However, regarding a conventional wristwatch type cellular phone, the operation section relating to phone functions is allocated on the surface or backside of the clocking section body, or on the wrist band as a hardware switch. When considering operationality, the operation section cannot be made in a too small manner. Thus, this causes a problem where the clocking section body or wrist band in which the operation section is mounted becomes larger than a normal clock not having phone functions, and mounting become remarkably worse.

Additionally, the conventional wristwatch type cellular phone has a problem involving antenna installation. It is relatively easier for a normal cellular phone to preserve sufficient space that can incorporate a retractable antenna into the chassis thereof. However, regarding wristwatch type cellular phone, the clocking section body is remarkably smaller than the cellular phone. Therefore, it is difficult to preserve sufficient space that can incorporate a retractable antenna. When intending to forcedly mount a retractable antenna, the clocking section body must be made larger. Nonetheless, mounting becomes worse.

Additionally, the aforementioned patent document 1 includes that a wrist band made with antenna material having adequate elasticity is formed and a loop formed when the wrist band is placed on the wrist is used as an antenna. However, this method is based on a condition where users make a phone call by putting the wrist band on their wrists. This dialing method is not suitable because the distance between the transmitter section and receiver section becomes less, and making a phone call becomes difficult.

In order to avoid such difficulty when making a phone call, it is proposed that the transmitter section and receiver section be positioned at the edge of the wrist band (for example, refer to the aforementioned patent documents 4, 7, and 8). In such case, calls are executed in a condition that the wrist band is removed from the wrist. However, under such condition, the loop antenna cannot be formed, and receiver sensitivity worsens. In particular, many calls are executed while in transit, when receiver sensitivity worsens due to a change of surrounding conditions, calls are cut off.

Additionally, the conventional wristwatch type cellular phone diverts the battery incorporated in the backside of dial plate for the use of clock, etc. and operates the phone functions. Thus, the battery of such wristwatch type cellular phone becomes used up to a greater extent than that of a normal clock without phone functions. Normally, the battery for the clock is compact and has a low capacity, and the battery must be frequently exchanged. Moreover, such battery exchange is required to be preformed by using specialized tools. Thus, this causes a remarkably troublesome issue.

SUMMARY OF THE INVENTION

The purpose of the present invention is to resolve the aforementioned problems, and to realize good operationality of the phone section without causing the clock section body or wrist band to be larger than necessary and without causing mounting to be deteriorated.

Additionally, the purpose of the present invention is to avoid inconveniences where calls are cut off due to deterioration of receiver sensibility without causing the clock section body or wrist band to be larger than necessary.

Moreover, the purpose of the present invention is intended to reduce difficulties associated with battery exchange.

A wristwatch type cellular phone of the present invention is equipped with an equipment body section and a wrist band so as to enable the equipment body section to be placed on or pulled out of a wrist, where the equipment body section incorporates dialing means that transact dialing functions and clocking means of a clock. It comprises a plurality of antennas that are established in the equipment body section or the wrist band; a reception failure detection means that detects occurrence of reception failure; and a switch means that switches used antennas to any of the plurality of antennas every time the reception failure detection means detects the occurrence of reception failure.

In another aspect of the present invention, the wristwatch type cellular phone comprises the wrist band structured to enable storage of a thin battery where a part or whole thereof is formed into a pouched shape, and a connector means that electrically connects the battery and an electronic circuit within the equipment body section.

In another aspect of the present invention, the equipment body section comprises an electronic dial plate displaying the numbers of 1:00 through 12:00 of the clock at each apex location where the circumference is divided by 12, and which is structured by a touch panel where the numbers of 1:00 through 10:00 at least are allocated to a numeric keypad; and the dialing means which detects an operational location on the touch panels and transacts the dialing functions according to such detected operational location.

As explained above, the present invention establishes the plurality of antennas in the equipment body section or the wrist band, and the antenna can be switched and used every time reception failure is detected. Thus, inconvenience where calls are cut off due to deterioration of reception sensitivity can be avoided without mounting becoming deteriorated so that the equipment body section or wrist band becomes larger than necessary.

Also, in another aspect of the present invention, a part or a whole of the wrist band is formed into a pouched shape, where the thin battery is embedded. This can easily allow exchange or charge of the battery, and can reduce the difficulties associated with frequent battery exchange without mounting becoming deteriorated so that the equipment body section or wrist band becomes larger than necessary.

Moreover, according to another aspect of the present invention, the dial plate is structured by a touch panel, and calls can be made through the operations of such touch panel. Thus, this can realize good operationality of the phone section without mounting becoming deteriorated so that the equipment body section or wrist band becomes larger than necessary.

DETAILED DESCRIPTION OF THE PREFERRED EMBODIMENTS

Figure 1:
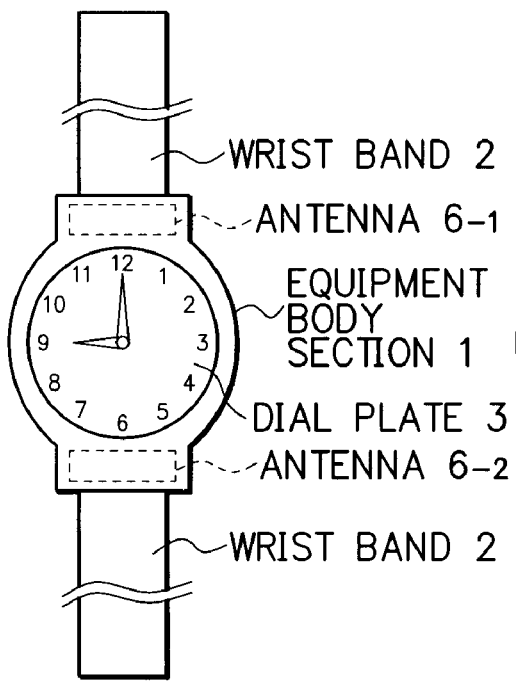
FIG. 1 is a diagram showing an example of the exterior structure of the wristwatch type cellular phone of the embodiment.
Figure 1:
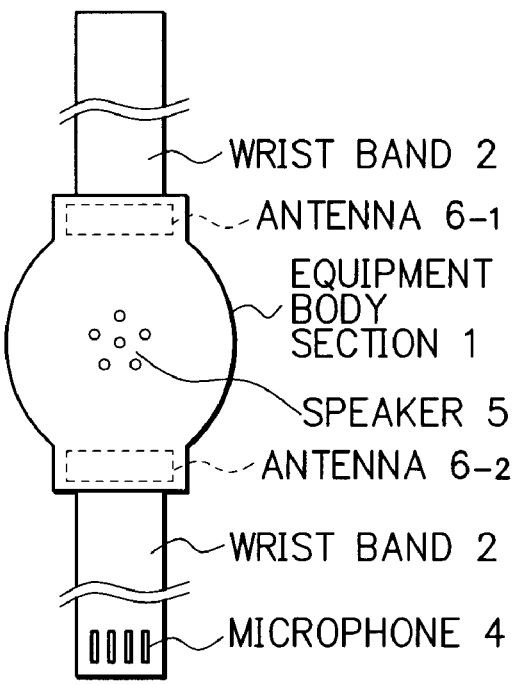

Hereinafter, one embodiment of the present invention will be described based upon the drawings. FIG. 1 is a diagram showing an exterior structure of the wristwatch type cellular phone of the embodiment. As shown in FIG. 1, the wristwatch type cellular phone of the embodiment comprises the equipment body section 1 and the wrist band 2 so as to enable the equipment body section 1 to be placed on or pulled out of a wrist.

The surface of the equipment body section 1 has a dial plate 3 displaying numbers of 1:00 through 12:00 of the clock at each apex location where the circumference is divided by 12. Such dial plate 3 is an electronic dial plate that electronically displays the numbers of 1:00 through 12:00 and a clock short hand and long hand, and is structured by the touch panel where the numbers of 1:00 through 10:00 at least are allocated to numeric keypad (10 o'clock is allocated to the number 0).

It is possible for the numbers of 11:00 and 12:00 to be allocated to function keys other than those of the numeric keypad. For example, the number of 11 can be allocated to a connection button, and the number of 12 can be allocated to a disconnection button. Also, although not shown in FIG. 1, optional marks or strings may be displayed in empty space where the numbers of 1-12 are not shown, where other function keys are allocated thereto.

Calls can be made through touching a connection button (the number of 11) after a telephone number is inputted by touching a numeric keypad (the numbers of 1-10) that is structured by the touch panel. Simultaneously, regarding incoming calls, users can answer them through touching a connection button (the number of 11). Also, calls can be suspended through touching a disconnection button (the number of 12).

In addition, a number display of telephone numbers may be established in the empty space of the dial plate 3 so that users can confirm the inputted telephone numbers. Moreover, when no sufficient space exists in the empty space of the dial plate 3, an exclusive display (such as LCD) may be established on a part of the equipment body section 1 (for example, a portion where the dial plate 3 has not been formed in the equipment body section 1 applies).

The equipment body section 1 incorporates the $1^{st}$ electronics circuit above (equivalent to the dialing means of the present invention) that transacts the dialing functions mentioned, and the $2^{nd}$ electronics circuit (equivalent to the clocking means of the present invention) that performs the clocking operation of the clock and that performs the transactions to electronically display the time thereof. The $1^{st}$ electronics circuit has the function to detect a position operated on the touch panel of the dial plate 3 and to perform the transactions relating to dialing mentioned above according to the operation position through such detection.

The transmitter section (microphone 4) and receiver section (speaker 5) required for dialing are on the edge of the wrist band 2 and on the back side of the equipment body section 1, respectively. Since the speaker 5 is established in the equipment body section 1, when calling, users use the method where they hold the equipment body section 1 and place the speaker 5 over the ear. At this time, since the microphone 4 is established in the edge of wrist band 2, the microphone 4 is located near the mouth of users. Thus, users don't need to move the wristwatch type cellular phone every time users execute telephone transmitter and receiver operations. Thus, users can make a call in a natural way, just the same as with a normal cellular phone.

In addition, an antenna is necessary to make a call. In the embodiment, the plurality of antennas 6-1 and 6-2 are established in the equipment body section 1. For an example of FIG. 1, 2 antennas 6-1 and 6-2 are embedded in 2 top and bottom positions by pinching the dial plate 3. In addition, the allocated positions of antennas 6-1 and 6-2 are not limited to such positions. For instance, antennas 6-1 and 6-2 may be embedded in 2 left and right positions through pinching the dial plate 3, or may be embedded in 2 wrist bands 2 connected from both sides of the equipment body section 1. Also, the number of antennas is not limited to 2. In short, having a plurality of antennas is included in the technical scope of the present invention.

The type of antenna is not particularly limited regarding the embodiment. Using either a plane antenna that can be structured to be compact or a loop antenna where a conducting wire is formed into a loop shape is desirable. However, if types of antenna other than those can be embedded in the equipment body section 1 or wrist band 2, such antenna may be acceptable. When an antenna is allocated in the wrist band 2, since the wrist band 2 has a comparatively long shape in a longitudinal direction, a larger antenna than that established in the equipment body section 1 can be structured and reception sensitivity can be improved.

Figure 2:
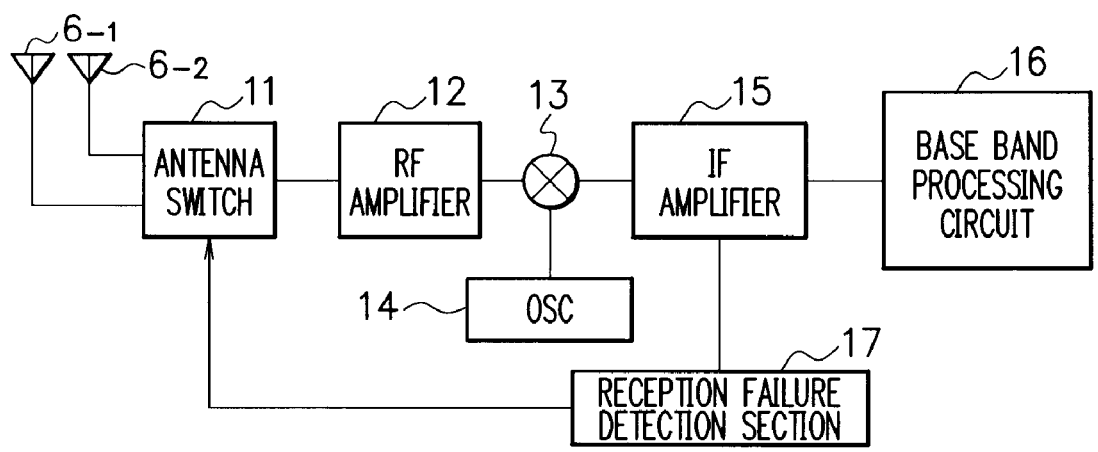
FIG. 2 is a block diagram showing the functional structure of the electronics circuit relating to the dialing function so as to allow spatial diversity of the embodiment.

The $1^{st}$ electronics circuit (not shown in FIG. 1) incorporated in the equipment body section 1 has a functional structure in order to allow spatial diversity that selectively switches between and uses 2 antennas 6-1 and 6-2. FIG. 2 is a block diagram showing the functional structure necessary to allow such spatial diversity, and shows the structure relating to a reception party of the dial function (illustration regarding the structure of a transmission party is omitted).

In FIG. 2, RF amplifier 12 receives high-frequency (RF) signals transmitted from the other party of calls via either antennas 6-1 or 6-2, and an antenna switch 11, and amplifies them. The mixer 13 generates intermediate frequency (IF)

signals through mixing the high-frequency signals outputted from RF amplifier 12 and the signals of local oscillator frequency outputted from the local oscillator 14, and outputs them to the IF amplifier 15 of the following stage.

The IF amplifier 15 performs predominated transactions such as amplifying the IF signals outputted from the mixer 13, and outputs such signals to the base band processing circuit 16 of the following stage. The base band processing circuit 16 executes an analog-digital conversion regarding the IF signals outputted from the IF amplifier 15, obtains digital audio signals, and executes predominated signal processing. The digital audio signals concerning which signal processing is executed are converted to the analog audio signals through a digital-analog conversion, and such analog audio signals are outputted from the speaker 5.

The reception failure detection section 17 detects reception failure such as noise or decline in reception sensitivity, which occurs due to multi-path or fluctuation of electric field. Specifically, such section 17 always monitors the level of IF signals outputted from the IF amplifier 15 and judges that noise occurs when the level thereof exceeds the $1^{st}$ threshold. Also, such section 17 judges that the reception sensitivity declines when the level thereof becomes smaller than the $2^{nd}$ threshold. When such reception failure is detected, the section 17 controls the antenna switch 11 and alternately switches antennas 6-1 or 6-2.

This is to say, when the reception failure detection section 17 detects reception failure while the $1^{st}$ antenna 6-1 is used, the connection of antenna switch 11 is switched to the side of the $2^{nd}$ antenna 6-2. Through this, the $2^{nd}$ antenna 6-2 is used thereafter.

Also, when the reception failure detection section 17 detects reception failure while the $2^{nd}$ antenna 6-2 is used, the connection of antenna switch 11 is switched to the side of the $1^{st}$ antenna 6-1. Through this, the $1^{st}$ antenna 6-1 is used thereafter.

As mentioned above, 2 antennas 6-1 and 6-2 are established in the embodiment. Thus, when reception failure occurs while one antenna is used, use is switched to the other antenna. This can change the reception situation when reception failure occurs through switching a used antenna, and can immediately allow avoidance of an occurring reception failure.

Figure 3:
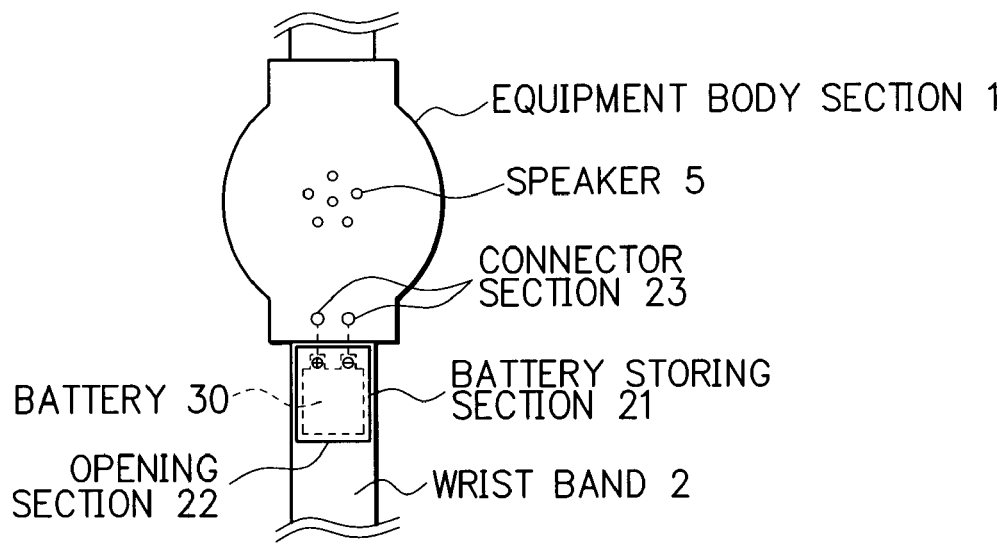
FIG. 3 is a diagram showing an example of the structure of the wrist band of the embodiment.

FIG. 3 is a diagram showing an example of structure of the wrist band 2. As shown in FIG. 3, the pouched battery storing section 21 is established close to the equipment body section 1 on the back side of the wrist band 2 (illustration is omitted in FIG. 1). The opening section 22 is established at one end of the battery storing section 21. It is structured so that the thin battery 30 can be pulled or inserted into the battery storing section 21 from the opening section 22.

The positive and negative electrodes are formed regarding the battery 30. When the battery 30 is inserted into the battery storing section 21, the electrodes of the battery 30 electronically connect the connector section 23. The connector section 23 electronically connects the electrodes of the battery 30 with the electronics circuit (not illustrated) within the equipment body section 1.

It is desirable for the battery 30 to be a lithium polymer battery which can be manufactured as compact, light, and with high longevity. A lithium polymer battery is made as such: solid or highly clay-like gelatinous electrolytic substances are inserted between both electrodes and the exterior of such substances are enclosed by aluminum laminate film. And despite the fact that such battery is ultralight, it can be manufactured with a thin-model equivalent to a thickness of about 1 mm, and has flexibility sufficient to be freely bent.

Thus, even when the battery 30 is inserted into the battery storing section 21 of the wrist band 2, the freely bending flexibility required for the wrist band 2 is not deteriorated.

As mentioned above, the structure of the embodiment is such that the battery storing section 21 is established in the wrist band 2, and the battery 30 can be pulled out and inserted freely. Thus, the battery 30 can be easily exchanged, and troubles of battery exchange can be reduced.

Figure 4:
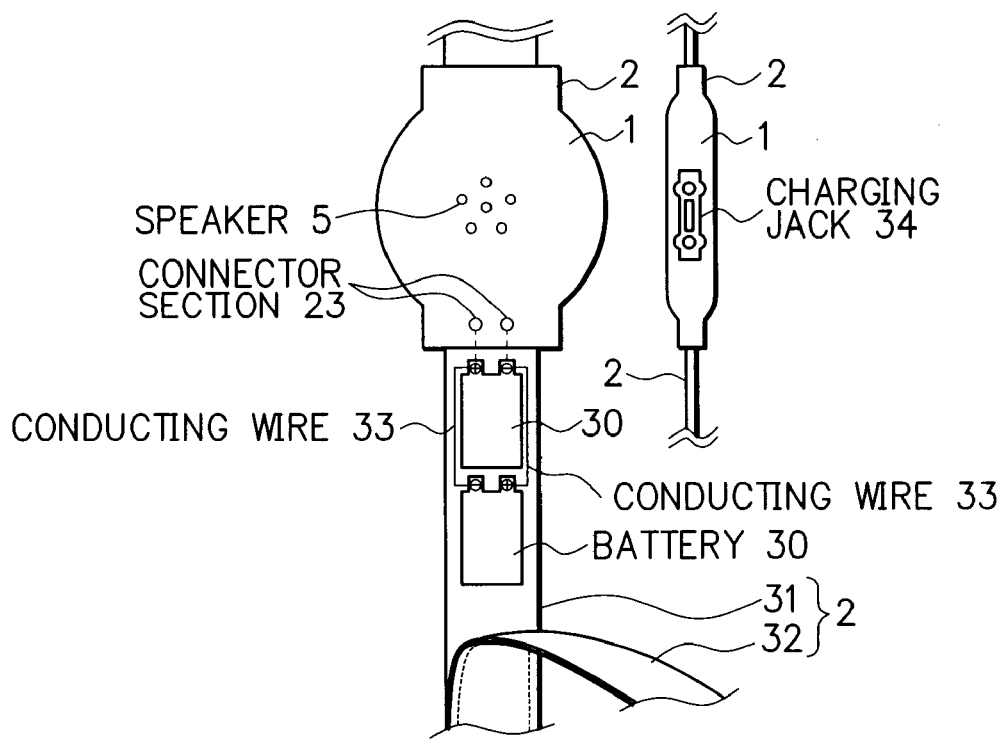
FIG. 4 is a diagram showing an example of another structure of the wrist band and the equipment body section of the embodiment.

FIG. 4 is a diagram showing another example of the structure of the wrist band 2. In the example of FIG. 4, the wrist band 2 is structured so that the outer skin 31 and the inner skin 32 overlap, and both edges thereof are sewed. The portion in between the outer skin 31 and the inter skin 32 is structured to be pouched. The battery 30 is inserted into such pouched portion.

In the example of FIG. 4, 2 pieces of battery 30 are stored in the pouched portion. Each electrode is electronically and serially connected by the conducting wire 33. Additionally, 2 pieces of battery 30 may be connected in a parallel manner. Also, the electrodes of the battery 30 located at the closest position to the equipment body section 1 are electronically connected to the electronics circuit (not illustrated) within the equipment body section 1 via the connector 23.

A lithium polymer battery is also desirable for the battery 30 used here. A lithium polymer battery is a chargeable secondary battery. The charging jack 34 is established on the side of the equipment body section 1, where a charger (not illustrated) can be connected. The charging jack 34 is electronically connected to an electronics circuit not illustrated within the equipment body section 1, and can charge the battery 30 via the connector 23 through control of such electronics circuit.

In addition, an example where the pouched portion formed in the wrist band 2 stores 2 units of battery 30 has been explained above. However, 3 units of the battery 30 or more may be stored in line. Since the wrist band 2 has a comparatively long shape in a longitudinal direction, such wrist band 2 can store many units of battery 30. The battery 30 is stored in the wrist band 2 connected to both sides of the equipment body section 1, which enables many more units of battery 30 to be stored.

This can allow a structure involving a large capacity of batteries in the entirety, even when individual units of battery 30 have small capacities. When calls that require a measurable amount of power are frequently executed, such phone can be used for long hours. Even when the remaining amount of battery is becoming deficient, battery exchange is unnecessary and charging may be acceptable. Thus, difficulties associated with frequent battery exchange can be avoided. Furthermore, conventionally, a wrist band has been used only for putting the equipment body section 1 on the wrist. However, the wrist band 2 is effectively used, and buries a plurality of thin batteries 30. Thus, mounting does not become deteriorated so that the equipment body section 1 or wrist band 2 becomes larger than necessary in order to increase battery capacity.

As explained in detail above, the wristwatch type cellular phone in the embodiment structures the dial plate 3 by the touch panel, and enables making a phone call through the operations of such touch panel. Thus, it is not necessary for an operation section based on a hardware switch to be established on the equipment body section 1 or the wrist band 2. This can realize good operationality of the phone section without mounting becoming deteriorated so that the equipment body section 1 or wrist band 2 becomes larger than necessary.

In addition, in the embodiment, a plurality of compact antennas 6-1 and 6-2 are embedded within the equipment body section 1 or the wrist band 2, and the antenna can be switched and used every time reception failure is detected. Thus, for example, when the reception sensitivity of one antenna in use worsens, good reception sensitivity can be gained through conversion to another antenna. This can allow avoidance of the inconvenience of cut-off calls due to deterioration of reception sensitivity without mounting becoming deteriorated so that the equipment body section 1 or wrist band 2 becomes larger than necessary.

Moreover, in the embodiment, a part or a whole of the wrist band 2 is formed into a pouched shape, where the thin battery 30 is embedded. This can easily allow exchange or charge of the battery, and can reduce the difficulties associated with frequent battery exchange without mounting becoming deteriorated so that the equipment body section 1 or wrist band 2 becomes larger than necessary.

In addition, in the above embodiment, the wristwatch type cellular phone that implements the following 3 conditions is explained: the dial plate 3 is structured by the touch panel, spatial diversity is performed through establishment of the plurality of antennas 6-1 and 6-2, and the battery 30 is embedded in the wrist band 2. However, a wristwatch type cellular phone that implements at least one condition from thereamong may be structured.

Furthermore, in the above embodiment, the wrist band 2 is structured with flexible materials having appropriate elasticity (for example, soft and sturdy materials such as leather). Simultaneously, the wrist band 2 may be structured with comparatively hard materials (for example, ceramic, plastic, or metals such as steel) so that the positions of microphone 4 and speaker 5 can be preserved easily during calls. However, in such case, it is necessary to process the wrist band 2 to be fitted onto the wrist when it is tightened.

In addition, the embodiments explained above have shown only one example of the possible incarnations upon implementing the present invention. This should not cause the technical scope of the present invention to be restrictively interpreted. Also, the configurations or structures of each section shown in the above embodiments have shown only one example of the possible incarnations upon implementing the present invention. This should not cause the technical scope of the present invention to be restrictively interpreted. That is to say, the present invention can be implemented in various forms, without deviating from the spirit or the main characteristics thereof.

INDUSTRIAL APPLICABILITY

This present invention is useful for a wristwatch type cellular phone equipped with an equipment body section having the clocking functions of the clock, a wrist band enabling the equipment body section to be placed on or pulled out of a wrist, and an equipment body section incorporating the electronics circuit of the phone section that transacts dialing functions.

The inventioned claimed is:

1. A wristwatch type cellular phone equipped with an equipment body section and a wrist band so as to enable said equipment body section to be placed on or pulled out of a wrist, where said equipment body section incorporates dialing means that transact dialing functions and clocking means of a clock, comprising:
    a plurality of antennas that are established in said equipment body section;
    a reception failure detection means for detecting occurrence of reception failure;
    a dial plate touch panel; and
    a switch means for switching used antennas to any of said plurality of antennas every time said reception failure detection means detects said occurrence of reception failure,
    wherein the plurality of antennas established in the equipment body section are embedded in at least one of top and bottom positions pinching the dial plate and right and left positions pinching the dial plate.

2. The wristwatch type cellular phone according to claim 1, wherein said antennas are thin plane antennas or loop antennas where conducting wires are formed into a loop shape.

3. A wristwatch type cellular phone equipped with an equipment body section and a wrist band so as to enable said equipment body section to be placed on or pulled out of a wrist, where said equipment body section incorporates dialing means that transacts dialing functions and clocking means of a clock, said equipment body section comprising:
    an electronic dial plate displaying the numbers of 1:00 through 12:00 of the clock at each apex location where the circumference is divided by 12, and which is structured by a touch panel where the numbers of 1:00 through 10:00 at least are allocated to a numeric keypad; and
    said dialing means for detecting an operational location on said touch panel and transacting said dialing functions according to such detected operational location,
    wherein the numbers 11 and 12 correspond to a connection button and disconnection button, respectively.

4. The wristwatch type cellular phone according to claim 3, further comprising:
    a plurality of antennas that are established in said equipment body section or said wrist band;
    a reception failure detection means for detecting occurrence of reception failure; and a switch means for switching used antennas into any of said plurality of antennas every time said reception failure detects detection means said occurrence of reception failure.

5. The wristwatch type cellular phone according to any one of claims 3 and 4,
    wherein said wrist band is structured to enable storage of a thin battery where a part or whole thereof is formed into a pouched shape; and
    the wristwatch type cellular phone further comprises a connector means for electrically connecting said battery and an electronic circuit within said equipment body section.

* * * * *